United States Patent
Ou-Yang et al.

(10) Patent No.: US 8,144,324 B2
(45) Date of Patent: Mar. 27, 2012

(54) METHOD AND APPARATUS FOR SCANNING HYPER-SPECTRAL IMAGE

(75) Inventors: Mang Ou-Yang, Taoyuan County (TW); Wei-Kai Su, Taipei County (TW); Kuo-Ting Ho, Taoyuan County (TW); Ting-Wei Huang, Taipei (TW); Yu-Ta Chen, Taipei (TW)

(73) Assignee: National Central University, Taoyuan County (TW)

( * ) Notice: Subject to any disclaimer, the term of this patent is extended or adjusted under 35 U.S.C. 154(b) by 362 days.

(21) Appl. No.: 12/405,198

(22) Filed: Mar. 16, 2009

(65) Prior Publication Data
US 2010/0053612 A1 Mar. 4, 2010

(30) Foreign Application Priority Data
Sep. 3, 2008 (TW) ................. 97133764 A

(51) Int. Cl.
*G01J 3/28* (2006.01)
(52) U.S. Cl. ........................................ 356/328
(58) Field of Classification Search ............. 356/326, 356/328, 329, 330, 334
See application file for complete search history.

(56) References Cited

U.S. PATENT DOCUMENTS

| 6,122,051 | A | * | 9/2000 | Ansley et al. ............... 356/326 |
| 2010/0039641 | A1 | * | 2/2010 | Park et al. .................. 356/310 |
| 2010/0078575 | A1 | * | 4/2010 | Reilly et al. ............... 250/458.1 |
| 2010/0328659 | A1 | * | 12/2010 | Bodkin ........................ 356/326 |

FOREIGN PATENT DOCUMENTS

| JP | 04-031720 | 2/1992 |
| JP | 2005-180931 | 7/2005 |

* cited by examiner

*Primary Examiner* — Tarifur Chowdhury
*Assistant Examiner* — Abdullahi Nur
(74) *Attorney, Agent, or Firm* — CKC & Partners Co., Ltd.

(57) ABSTRACT

The apparatus for scanning at least one hyper-spectral image comprises an optical system, the hyper-spectrometer and the relay module. The hyper-spectrometer is disposed apart from the optical system. The optical system can focus an optical image of a target in a focal plane thereof, where the focal plane contains a plurality of row portions of the optical image. The relay module can selectively relay one of the row portions of the optical image to the hyper-spectrometer. Moreover, a method for scanning at least one hyper-spectral image is disclosed in specification.

12 Claims, 8 Drawing Sheets

METHOD AND APPARATUS FOR SCANNING HYPER-SPECTRAL IMAGE

RELATED APPLICATIONS

This application claims priority to Taiwan Application Serial Number 97133764, filed Sep. 3, 2008, which is herein incorporated by reference.

BACKGROUND

1. Field of Invention

The present invention relates to arrangements for focusing or reflecting a ray or beam. More particularly, the present invention relates to a method and an apparatus for scanning at least one hyper-spectral image.

2. Description of Related Art

All substances are made of atoms and molecules, and the physical properties of a substance usually depend on the atomic or molecular arrangement thereof. Spectral imaging technique has been widely used to investigate the atomic or molecular structure of substances.

The field of spectral imaging can be divided into techniques called multi-spectral image, optical image, hyper-spectral image and ultra-spectral optical image. Generally, hyper-spectral deals with imaging narrow spectral bands over a contiguous spectral range, and produce the spectra of all pixels in the scene.

Hyper-spectrometers are widely used in scientific, military, biomedical, imaging, and resource-sensing applications. Hyper-spectrometers capture an array of optical images at a time, and to spectrally scan the entire target, it is required to move the spectrometer or the optics located in front of the spectrometer, and this is quite inconvenient for design and usage. Furthermore, moving the spectrometer or the optics arbitrarily would cause the problem of optical path difference and thus would degrade the quality of the optical image obtained.

In view of the foregoing, there is a need in the related field to provide suitable apparatuses and methods for scanning hyper-spectral image.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to an apparatus for scanning at least one hyper-spectral image.

According to one embodiment of the present invention, the apparatus comprises an optical system, the hyper-spectrometer and the relay module. In the apparatus, the hyper-spectrometer is disposed apart from the optical system. The optical system can focus an optical image of a target in a focal plane thereof, where the focal plane contains a plurality of row portions of the optical image. The relay module can selectively relay one of the row portions of the optical image to the hyper-spectrometer.

In another aspect, the present invention is directed to a method for scanning at least one hyper-spectral image.

According to one embodiment of the present invention, the method comprises steps of: first, an optical image of a target in a focal plane is focused, where the focal plane contains a plurality of row portions of the optical image; then, one of the row portions of the optical image is selected; then, one of the row portions of the optical image is captured.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
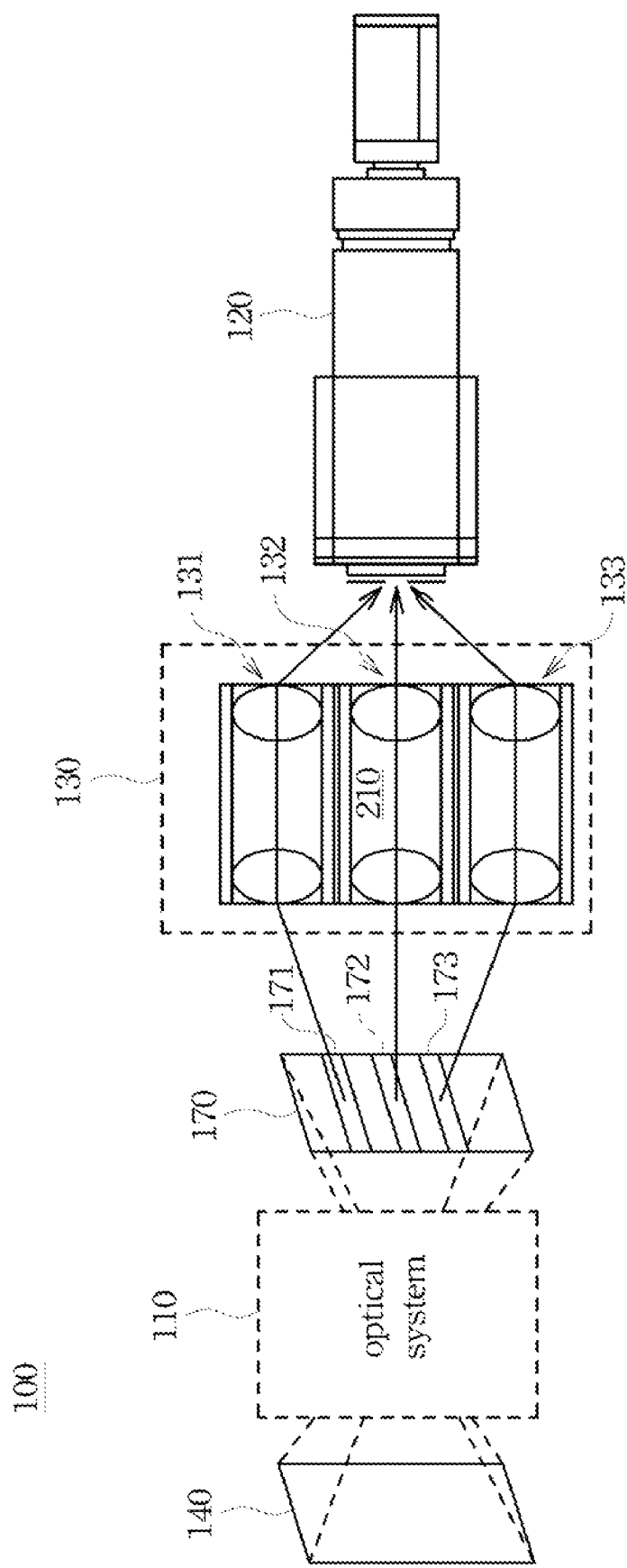
FIG. 1 is a schematic diagram of an apparatus for scanning at least one hyper-spectral image in accordance with one embodiment of the present invention.

FIG. 1 is a schematic diagram of an apparatus 100 for scanning at least one hyper-spectral image in accordance with one embodiment of the present invention. In FIG. 1 the apparatus 100 comprises an optical system 110, the hyper-spectrometer 120 and the relay module 130. In the apparatus 100, the hyper-spectrometer 120 is disposed apart from the optical system 110, and the relay module 130 is disposed between the optical system 110 and the hyper-spectrometer 120.

The optical system 110 can focus an optical image of a target 140 in a focal plane 170 thereof, where the focal plane 170 contains a plurality of row portions of the optical image, such as the row portions 171, 172, 173, in which these row portions of the optical image are parallel. In other words, the optical image within the focal plane 170 may be partitioned into a series of row portions. The relay module 130 can selectively relay one of the row portions of the optical image to the hyper-spectrometer 120.

The optical system 110 may comprise at least one object lens. In practice, the optical system 110 may be varied in accordance with the size of the target 140, the distance between the optical system 110 and the target 140 or the like, for example, the optical system 110 may be a microscope, a telescope or a set of lenses or the like.

The relay module 130 may comprise the relay lens 210. In FIG. 1, the relay lens 210 sends the row portion 172 of the optical image to the hyper-spectrometer 120 when the relay lens 210 is placed at the position 132; alternatively, the relay lens 210 sends the row portion 171 of the optical image to the hyper-spectrometer 120 when the relay lens 210 is placed at the position 131; alternatively, the relay lens 210 sends the row portion 173 of the optical image to the hyper-spectrometer 120 when the relay lens 210 is placed at the position 133. Accordingly, the relay module 130 can send these row portions of the optical image to the hyper-spectrometer 120 one by one; therefore, the hyper-spectrometer 120 can capture the complete optical image of the target 140 and then analyze spectrum information.

Figure 2:
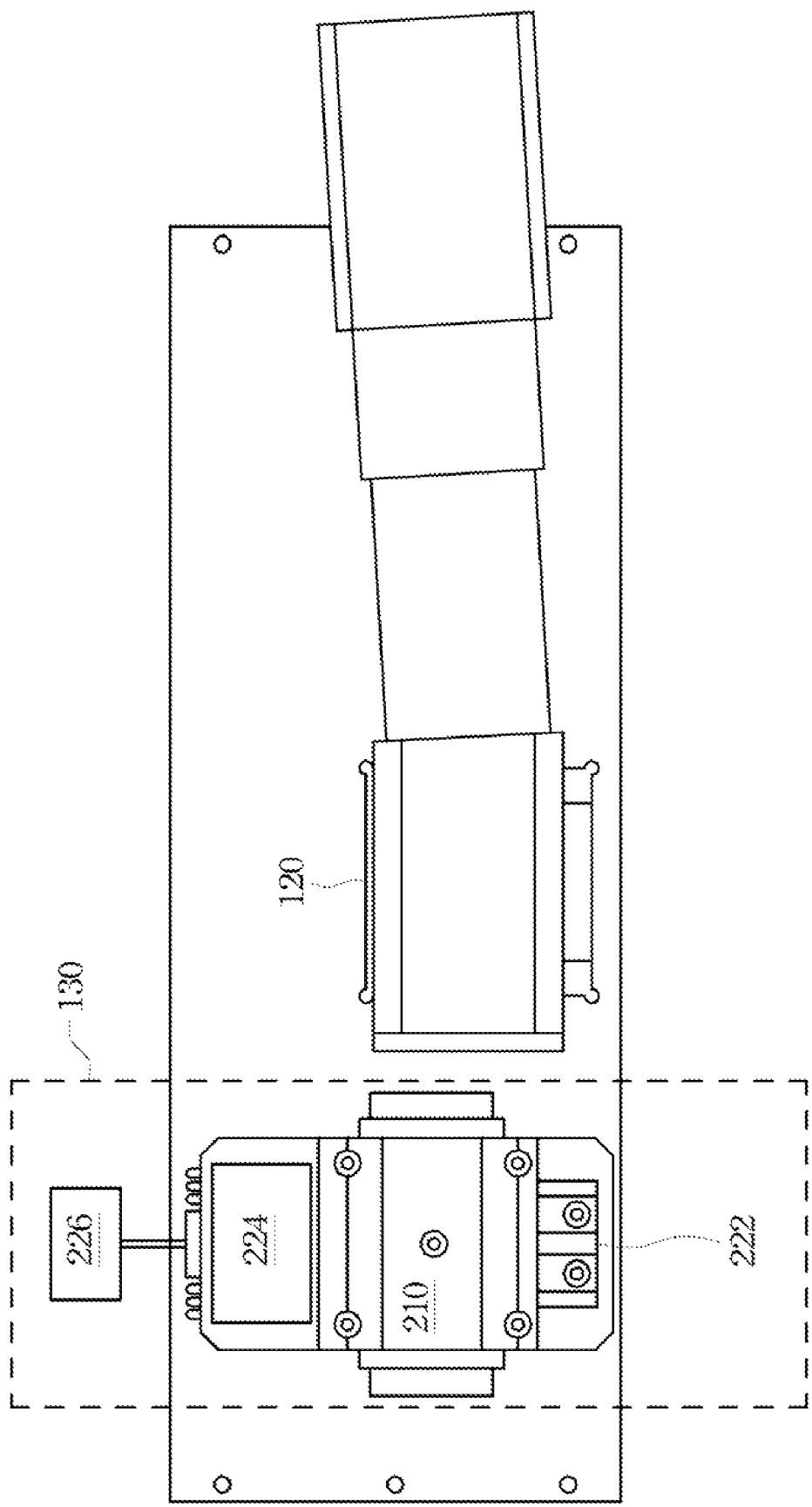
FIG. 2 is a lateral view of a relay module and a hyper-spectrometer of FIG. 1.

For a more complete understanding of the relay module 130, please refer to FIG. 2. FIG. 2 is a lateral view of the relay module 130 and the hyper-spectrometer 120 of FIG. 1. In FIG. 2, the relay module 130 comprises the relay lens 210 and a micro-motion device, where the micro-motion device comprises a slide rail 222, a stepper motor 224 and a calculating module 226. The micro-motion device can move the relay lens 210. The relay lens 210 can selectively send the above-mentioned one of the row portions of the optical image to the hyper-spectrometer 120.

In the embodiment, the relay lens 210 can relay one of the row portions of the optical image at one place to another, where without changing the size of said one of the row portions of the optical image. For this reason, the problem of optical path difference could be decreased and thus the quality of the optical image would be improved.

For a more complete understanding of the micro-motion device, please continue to refer to FIG. 2. In FIG. 2, the slide rail 222 is connected with the relay lens 210, where the longitudinal direction of the slide rail 222 parallels the row portions of the optical image. The calculating module 226 can control the stepper motor 224, and the stepper motor 224 can shift the relay lens 210 along the slide rail 222.

In the embodiment, the stepper motor 224 can control the velocity and the displacement of the relay lens 210, where the relay lens 210 reciprocates along the longitudinal direction of the slide rail 222; therefore, the relay lens 210 disposed at different positions could send different row portions of the optical image to the hyper-spectrometer 120.

One of ordinary skill in the art will appreciate that the above examples are provided for illustrative purposes only to further explain applications of the above-mentioned micro-motion device and are not meant to limit the present invention in any manner. Other devices, such as a micro electric mechanic system, piezoelectric material or the like, may be used as appropriate for a given application.

Figure 3:
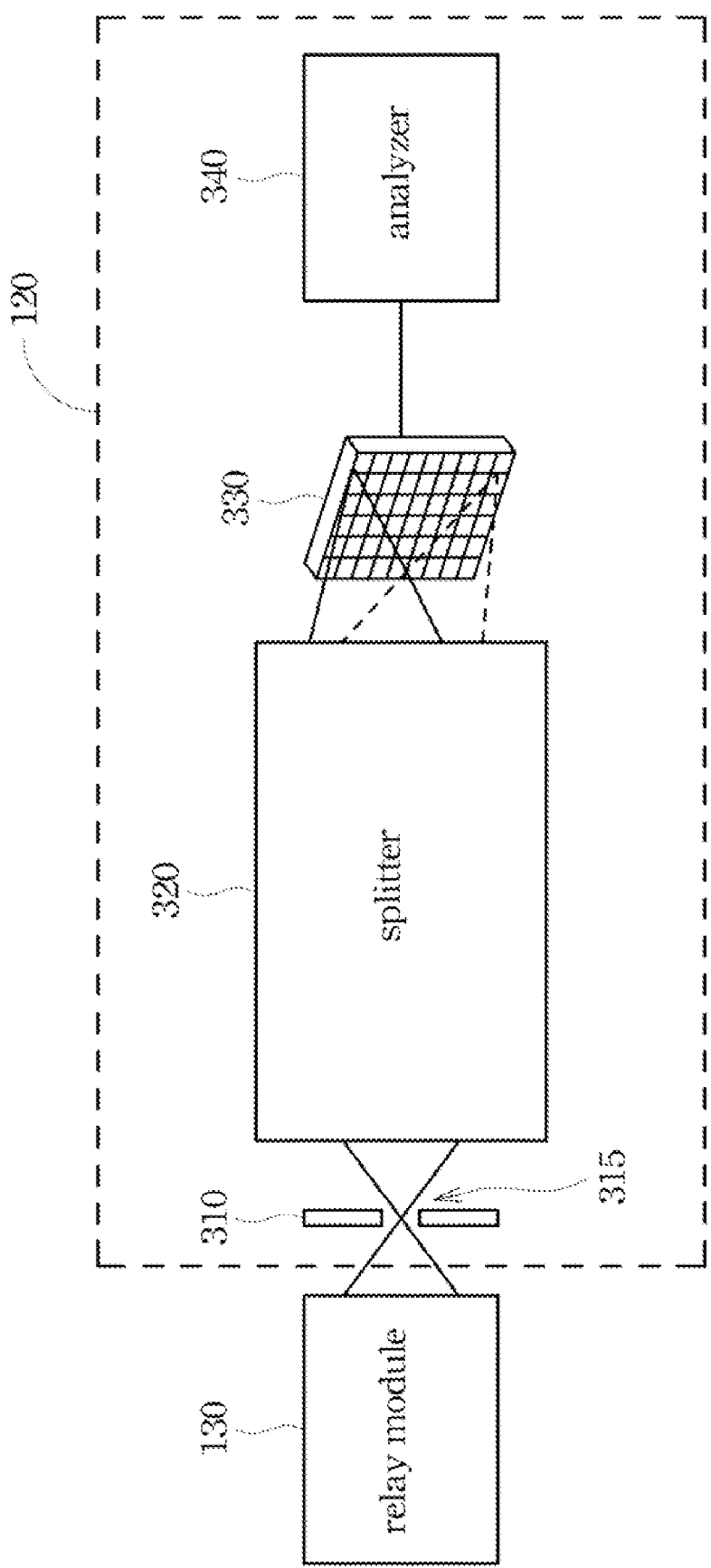
FIG. 3 is a schematic diagram of a hyper-spectrometer of FIG. 1.

For a more complete understanding of the hyper-spectrometer 120, please refer to FIG. 3. FIG. 3 is a schematic diagram of the hyper-spectrometer 120 of FIG. 1. In FIG. 3, the hyper-spectrometer 120 comprises a spatial window 310, a splitter 320, a photoreceptor 330 and an analyzer 340, where the spatial window 310 has a slit 315. The spatial window 310 is positioned to allow one of the row portions of the optical image to pass through the slit 315. The splitter 320 can diffract the one of the row portions of the optical image passed through the slit 315 into a hyper-spectral image. The photoreceptor 330 can transform the hyper-spectra image into an electric signal, wherein the photoreceptor 330 may comprise one of a charge coupled device and a complementary metal oxide semiconductor. The analyzer 340 can analyze the hyper-spectral image according to the electric signal. Thus, the hyper-spectrometer 120 can analyze the complete hyper-spectral image of the target 140 (shown in FIG. 1) after capturing all of the row portions of the optical image.

Figure 4:
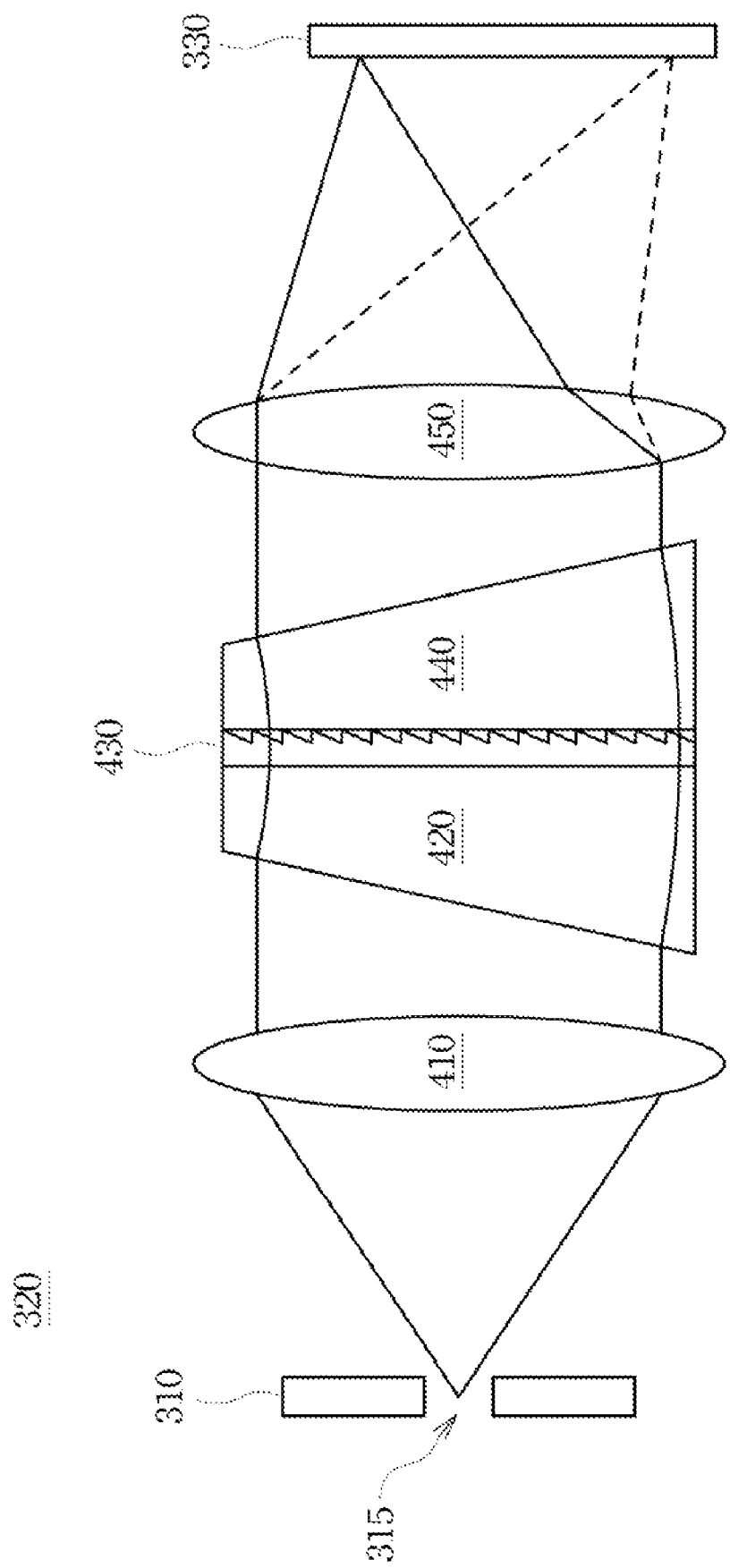
FIG. 4 is a schematic diagram of a splitter of FIG. 3.
Figure 5:
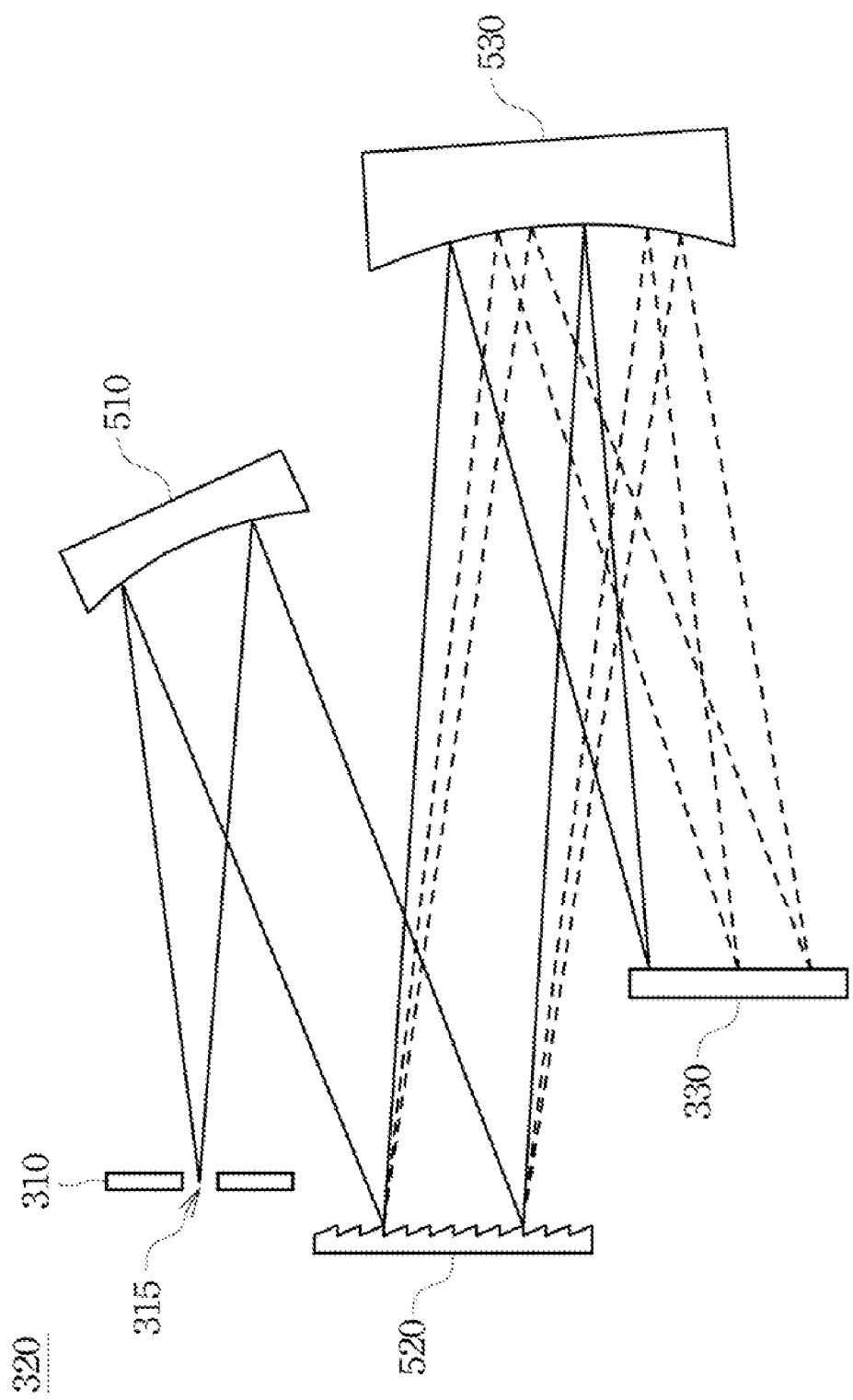
FIG. 5 is another schematic diagram of the splitter of FIG. 3.
Figure 6:
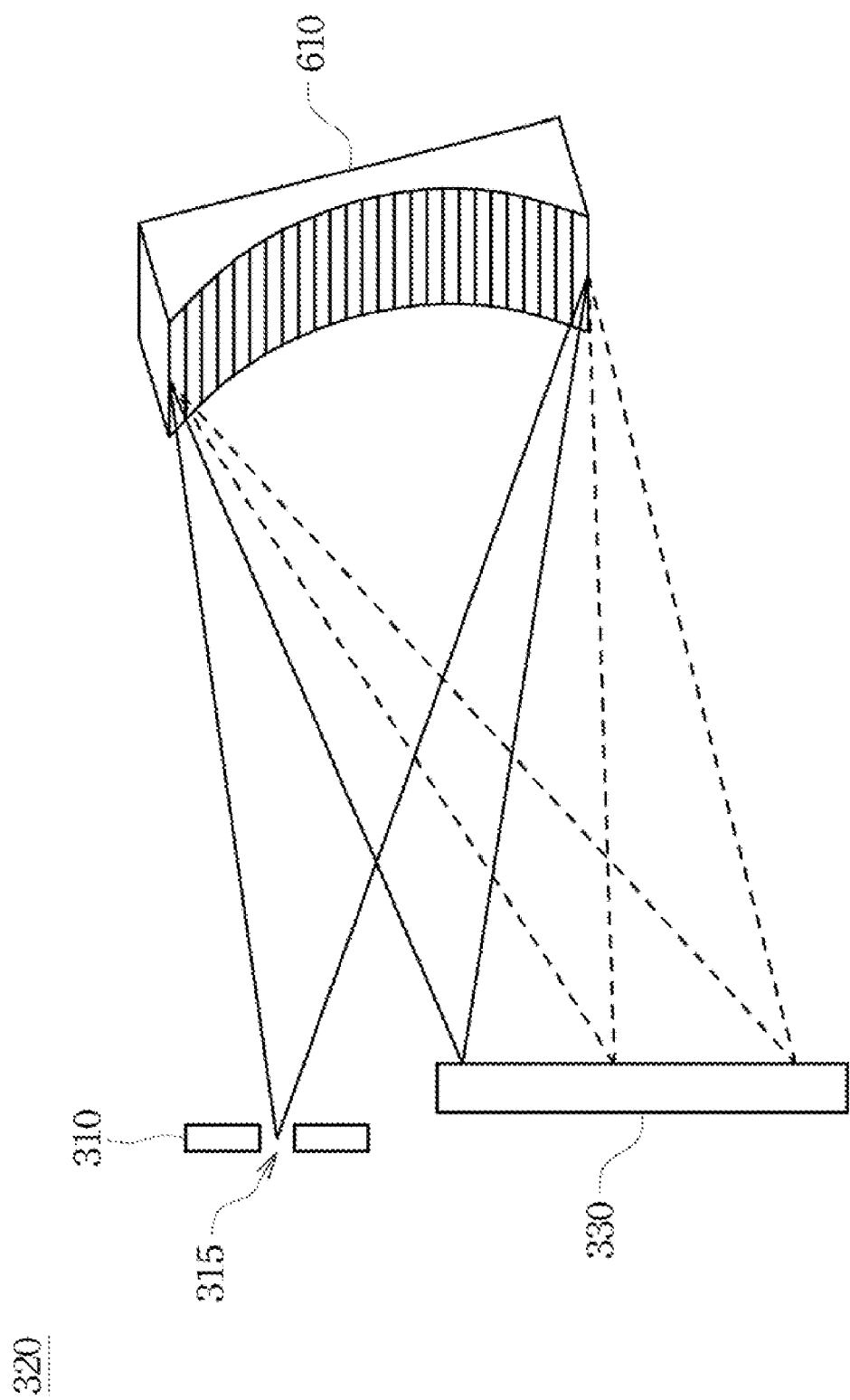
FIG. 6 is yet another schematic diagram of the splitter of FIG. 3.

The splitter 320 can split light in accordance with different wavelengths of the light corresponding to different indexes of refraction. For a more complete understanding of the splitter 320, please refer to FIG. 4, FIG. 5 and FIG. 6. FIG. 4, FIG. 5 and FIG. 6 show varied splitters 320 respectively.

FIG. 4 is a schematic diagram of the splitter 320 of FIG. 3. In FIG. 3, the splitter 320 comprises a collimating lens 410, a first prism 420, a diffraction grating 430, a second prism 440 and a focusing lens 450. The collimating lens 410 can collimate one of the row portions of the optical image passed through the slit 315. The first prism 420 can refract the collimated one of the row portions of the optical image. The diffraction grating 430 can diffract the refracted one of the row portions of the optical image into the hyper-spectral image. The second prism 440 can refract the hyper-spectral image. The focusing lens 450 can focus the refracted hyper-spectral image onto the photoreceptor 330.

In principles of optics, the collimating lens 410 transforms incident light into parallel light, and then the first prism 420 refract the parallel light into the diffraction grating 430 to generate diffraction light, and then the second prism 440 transforms the diffraction light into new parallel light, and then the focusing lens 450 focuses the new parallel light onto the photoreceptor 330. In addition, the diffraction grating 430 is pervious to light and has high polarization efficiency.

FIG. 5 is another schematic diagram of the splitter 320 of FIG. 3. In FIG. 3, the splitter 320 comprises a first concave mirror 510, a reflection grating 520 and a second concave mirror 530. The first concave mirror 510 can reflect and collimate one of the row portions of the optical image passed through the slit 315. The reflection grating 520 can diffract the reflected one of the row portions of the optical image into the hyper-spectral image. The second concave mirror 530 can reflect the hyper-spectral image onto the photoreceptor 330.

In principles of optics, the reflection grating 520 is a kind of flat reflection grating; therefore, incident light is transformed into parallel light by means of a lens or a concave mirror, such as the first concave mirror 510, and then the reflection grating 520 diffracts the parallel light into diffraction light, and then the diffraction light is focused onto the photoreceptor 330 by means of another lens or another concave mirror, such as the second concave mirror 530.

FIG. 6 is yet another schematic diagram of the splitter 320 of FIG. 3. In FIG. 6, the splitter 320 comprises a concave grating 610. In FIG. 6, the concave grating 610 can diffract one of the row portions of the optical image passed through the slit 315 into the hyper-spectral image and reflect the hyper-spectral image onto the photoreceptor 330.

In principles of optics, the concave grating 610 can both diffract and reflect light; therefore, other optical elements in the splitter 320 may be reduced, whereby the size of the hyper-spectrometer 120 (shown in FIG. 3).

In view of all of the above and the Figures, it should be readily apparent to those skilled in the art that the present disclosure introduces an apparatus for scanning at least one hyper-spectral image. The apparatus can scan the entire hyper-spectral image of the target without moving the target, the hyper-spectrometer or the optical system. Moreover, since the hyper-spectrometer or the optical system doesn't need to move, the problem of optical path difference could be decreased and thus the quality of the optical image would be improved.

Figure 7:
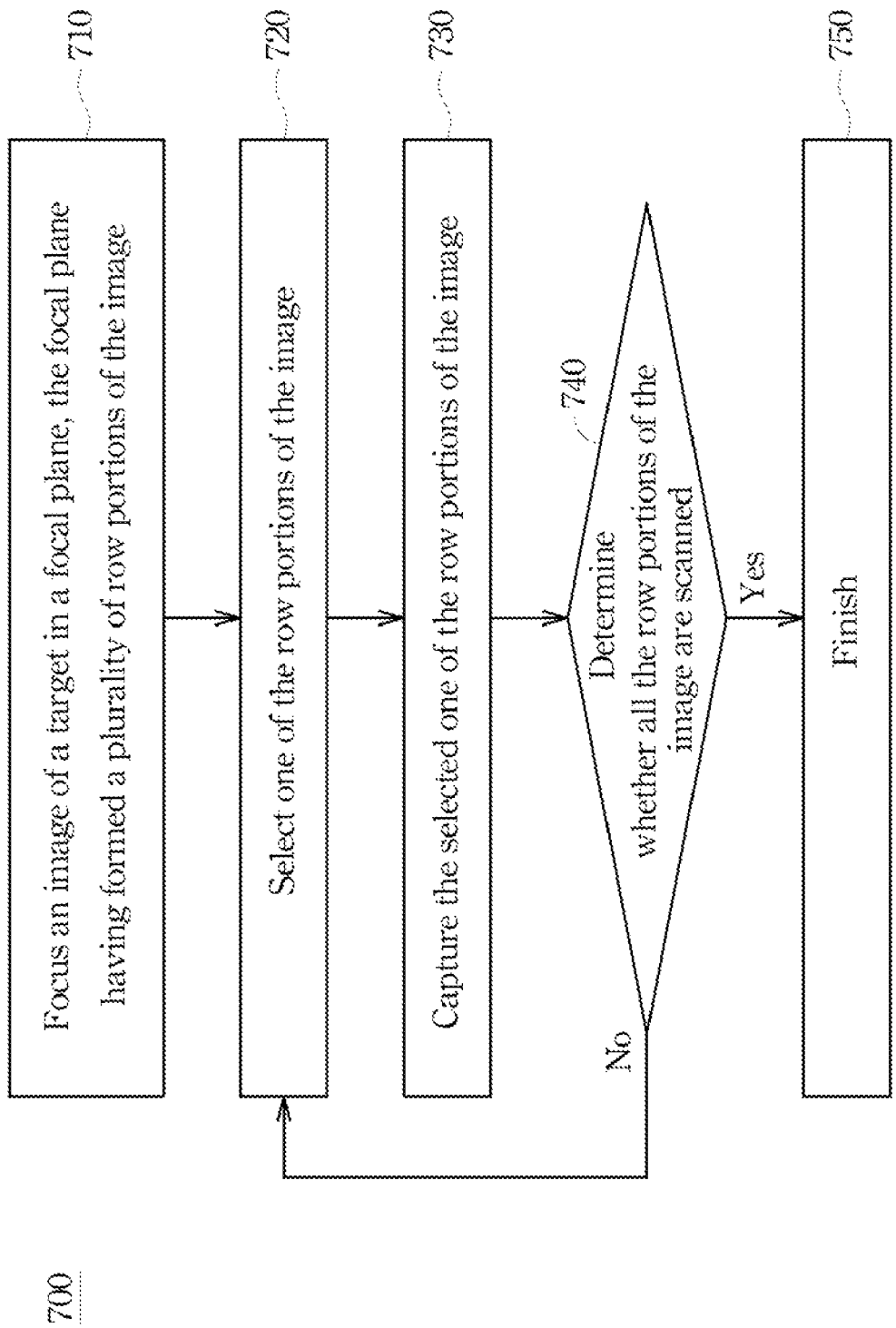
FIG. 7 shows a flow diagram of a method for scanning at least one hyper-spectral image in accordance with another embodiment of the present invention.

In another aspect, the present invention is directed to a method for scanning at least one hyper-spectral image; the method may apply to the apparatus 100 or the like, and may be applicable or readily adaptable to all technology nodes. Please refer to FIG. 7. FIG. 7 shows a flow diagram of the method 700 for scanning at least one hyper-spectral image in accordance with another embodiment of the present invention. The method 700 comprises step 710, step 720, step 730, step 740 and step 750. In the method 700, it should be noted that one step might be performed in series, in parallel, in combination, or otherwise in conjunction with another if the specific order is not described or inferred in the embodiment.

In step 710, an optical image of a target is focused in a focal plane, wherein the focal plane contains a plurality of row portions of the optical image. In step 720, one of the row portions of the optical image is selected. In step 730, the one of the row portions of the optical image is captured. In step 740, whether all the row portions of the image are scanned is determined. In step 750, the method 700 is over.

During step 720, a relay lens is shifted along a direction paralleled the row portions of the optical image, whereby the relay lens can select one of the row portions of the optical image and relay the one of the row portions of the optical image at one place to another, where without changing the size of the one of the row portions of the optical image. For this reason, the problem of optical path difference could be decreased and thus the quality of the optical image would be improved.

During step 730, one of the row portions of the optical image relayed from the relay lens is captured, and then the one of the row portions of the optical image is analyzed. Thus, the row portions of the optical image relayed from the relay lens are captured one by one; therefore, the complete optical image of the target is captured and then spectrum information is analyzed.

Figure 8:
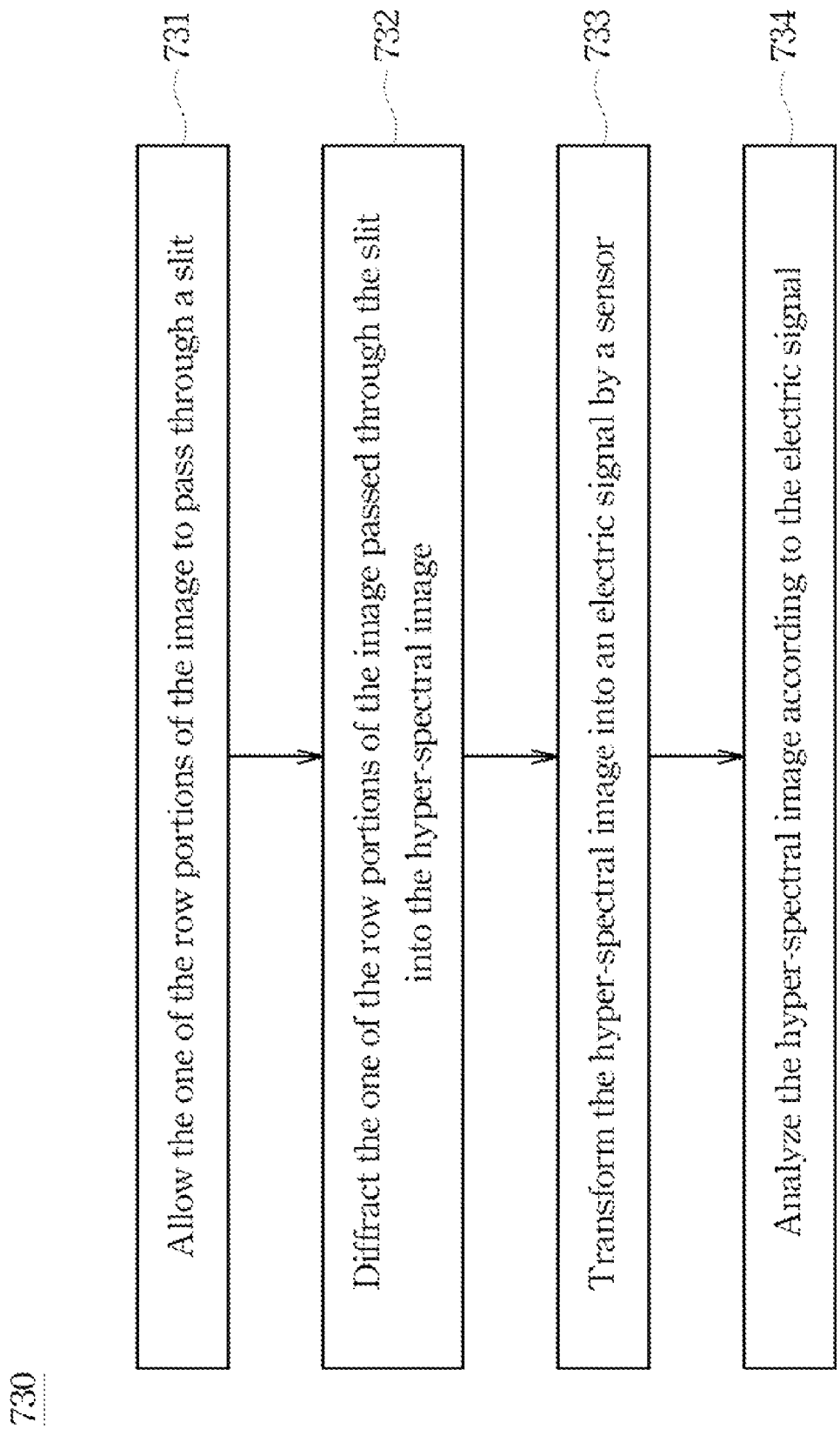
FIG. 8 shows a flow diagram of step 730 of FIG. 7.

For a more complete understanding of step 730, please refer to FIG. 8. FIG. 8 shows a flow diagram of step 730 of FIG. 7. In FIG. 8, the step 730 comprises sub-step 731, sub-step 732, sub-step 733 and step 734. In the step 730, it should be noted that one sub-step might be performed in series, in parallel, in combination, or otherwise in conjunction with another if the specific order is not described or inferred in the embodiment.

In the sub-step 731, one of the row portions of the optical image is allowed to pass through a slit. In the sub-step 732, the one of the row portions of the optical image passed through the slit is diffracted into a hyper-spectral image. In the sub-step 733, the hyper-spectral image is transformed into an electric signal by a sensor, such as the above-mentioned photoreceptor 330 in FIG. 3. In the sub-step 734, the hyper-spectral image is analyzed according to the electric signal. Thus, step 730 may proceed to sub-step 731, sub-step 732, sub-step 733 and step 734 in step 730, and step 730 may be repeated in an iterative manner until all the row portions of the image are scanned as determined in step 740 shown in FIG. 8; therefore, the complete hyper-spectral image of the target is analyzed after capturing all of the row portions of the optical image.

The sub-step 732 may proceed to split light in accordance with different wavelengths of the light corresponding to different indexes of refraction. For a more complete understanding of the sub-step 732, the sub-step 732 may be varied in one or more embodiments as described below.

In one embodiment, the sub-step 732 may comprise the following stages in sequential order. First, one of the row portions of the optical image passed through the slit 315 is collimated, and then the collimated one of the row portions of the optical image is refracted, and then the refracted one of the row portions of the optical image is diffracted into the hyper-spectral image, and then the hyper-spectral image is refracted, and then the refracted hyper-spectral image is focused onto the sensor.

In principles of optics, incident light is transformed into parallel light, and then the parallel light is refracted, and thereby the refracted parallel light is diffracted into diffraction light, and then the diffraction light is transformed into new parallel light, and then the new parallel light is focused onto the sensor.

In another embodiment, the sub-step 732 may comprise the following stages in sequential order. First, one of the row portions of the optical image passed through the slit is reflected and collimated, and then the reflected one of the row portions of the optical image is diffracted into the hyper-spectral image, and the hyper-spectral image is reflected onto the sensor.

In principles of optics, incident light is transformed into parallel light, and then the parallel light is diffracted into diffraction light, and then the diffraction light is focused onto the sensor.

In yet another embodiment, the sub-step 732 may comprise the following stage: one of the row portions of the optical image passed through the slit is diffracted into the hyper-spectral image and the hyper-spectral image is reflected onto the sensor. In principles of optics, incident light is both diffracted and reflected to simplify the sub-step 732.

In view of all of the above and the Figures, it should be readily apparent to those skilled in the art that the present disclosure introduces a method for scanning at least one hyper-spectral image. The apparatus can scan the entire hyper-spectral image of the target without moving the target, the hyper-spectrometer, the optical system or the like. Moreover, since the hyper-spectrometer or the optical system doesn't need to move, the problem of optical path difference could be decreased and thus the quality of the optical image would be improved.

It will be apparent to those skilled in the art that various modifications and variations can be made to the structure of the present invention without departing from the scope or spirit of the invention. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An apparatus for scanning at least one hyper-spectral image, comprising:
   an optical system for focusing an optical image of a target in a focal plane thereof, wherein the focal plane contains a plurality of row portions of the optical image;
   a hyper-spectrometer disposed apart from the optical system; and
   a relay module for selectively relaying one of the row portions of the optical image to the hyper-spectrometer without moving the hyper-spectrometer, wherein the relay module comprises:
   a relay lens; and
   a micro-motion device for moving the relay lens, wherein the micro-motion device comprises:
   a slide rail connected with the relay lens, wherein the longitudinal direction of the slide rail parallels the row portions of the optical image;

a stepper motor for shifting the relay lens along the slide rail; and a calculating module for controlling the stepper motor.

2. The apparatus as claimed in claim 1, wherein the hyper-spectrometer comprises:

a spatial window having a slit, wherein the spatial window is positioned to allow the one of the row portions of the optical image to pass through the slit;

a splitter for diffracting the one of the row portions of the optical image passed through the slit into the hyper-spectral image;

a photoreceptor for transforming the hyper-spectral image into an electric signal; and a analyzer for analyzing the hyper-spectral image according to the electric signal.

3. The apparatus as claimed in claim 2, wherein the splitter comprises:

a collimating lens for collimating the one of the row portions of the optical image passed through the slit;

a first prism for refracting the collimated one of the row portions of the optical image;

a diffraction grating for diffracting the refracted one of the row portions of the optical image into the hyper-spectral image;

a second prism for refracting the hyper-spectral image; and a focusing lens for focusing the refracted hyper-spectral image onto the photoreceptor.

4. The apparatus as claimed in claim 2, wherein the splitter comprises:

a first concave mirror for reflecting and collimating the one of the row portions of the optical image passed through the slit;

a reflection grating for diffracting the reflected one of the row portions of the optical image into the hyper-spectral image; and a second concave mirror for reflecting the hyper-spectral image onto the photoreceptor.

5. The apparatus as claimed in claim 2, wherein the splitter comprises:

a concave grating for diffracting the one of the row portions of the optical image passed through the slit into the hyper-spectral image and reflecting the hyper-spectral image onto the photoreceptor.

6. The apparatus as claimed in claim 2, wherein the photoreceptor comprises one of a charge coupled device and a complementary metal oxide semiconductor.

7. The apparatus as claimed in claim 1, wherein the optical system at least comprises an objective lens.

8. The apparatus as claimed in claim 1, wherein the optical system is a microscope or a telescope.

9. A method for scanning at least one hyper-spectral image, comprising:

focusing an optical image of a target in a focal plane, wherein the focal plane contains a plurality of row portions of the optical image; and selectively relaying one of the row portions of the optical image to a hyper-spectrometer without moving the hyper-spectrometer;

allowing the one of the row portions of the optical image to pass through a slit of the hyper-spectrometer;

diffracting the one of the row portions of the optical image passed through the slit into the hyper-spectral image;

transforming the hyper-spectral image into an electric signal by a sensor of the hyper-spectrometer; and analyzing the hyper-spectral image according to the electric signal, wherein diffracting the one of the row portions of the optical image passed through the slit comprises the following steps:

collimating the one of the row portions of the optical image passed through the slit;

refracting the collimated one of the row portions of the optical image;

diffracting the refracted one of the row portions of the optical image into the hyper-spectral image;

refracting the hyper-spectral image; and focusing the hyper-spectral image to the sensor.

10. The method as claimed in claim 9, wherein selectively relaying one of the row portions of the optical image comprises:

shifting a relay lens along a direction paralleled the row portions of the optical image.

11. The method as claimed in claim 10, further comprising:

capturing the one of the row portions of the optical image relayed from the relay lens; and analyzing the one of the row portions of the optical image.

12. A method for scanning at least one hyper-spectral image, comprising:

focusing an optical image of a target in a focal plane, wherein the focal plane contains a plurality of row portions of the optical image; and selectively relaying one of the row portions of the optical image to a hyper-spectrometer without moving the hyper-spectrometer;

allowing the one of the row portions of the optical image to pass through a slit of the hyper-spectrometer;

diffracting the one of the row portions of the optical image passed through the slit into the hyper-spectral image;

transforming the hyper-spectral image into an electric signal by a sensor of the hyper-spectrometer; and analyzing the hyper-spectral image according to the electric signal, wherein diffracting the one of the row portions of the optical image passed through the slit comprises the following steps:

reflecting and collimating the one of the row portions of the optical image passed through the slit;

diffracting the reflected one of the row portions of the optical image into the hyper-spectral image; and reflecting the hyper-spectral image to the sensor.

* * * * *